United States Patent
Wei

(10) Patent No.: US 9,265,382 B2
(45) Date of Patent: Feb. 23, 2016

(54) SHOWER DOOR ASSEMBLY

(71) Applicant: Foshan Ideal Co., Ltd., Foshan (CN)

(72) Inventor: Wuxiang Wei, Foshan (CN)

(73) Assignee: Foshan Ideal Co., Ltd., Foshan (CN)

( * ) Notice: Subject to any disclaimer, the term of this patent is extended or adjusted under 35 U.S.C. 154(b) by 432 days.

(21) Appl. No.: 13/858,859

(22) Filed: Apr. 8, 2013

(65) Prior Publication Data

US 2014/0237715 A1    Aug. 28, 2014

(30) Foreign Application Priority Data

Feb. 27, 2013   (CN) ...................... 2013 2 0089404 U

(51) Int. Cl.
*A47K 3/34*   (2006.01)
*A47K 3/30*   (2006.01)
*F16B 7/04*   (2006.01)

(52) U.S. Cl.
CPC ... *A47K 3/34* (2013.01); *A47K 3/30* (2013.01); *F16B 7/0473* (2013.01); *A47K 2003/307* (2013.01)

(58) Field of Classification Search
CPC .................................. A47K 3/34; A47K 3/30
USPC ................ 49/504, 505; 6/607, 601; 52/126.3, 52/656.1–656.9
See application file for complete search history.

(56) References Cited

U.S. PATENT DOCUMENTS

2013/0025232 A1*   1/2013   Wang ........................... 52/656.4

* cited by examiner

*Primary Examiner* — Lauren Crane
(74) *Attorney, Agent, or Firm* — Sheppard Mullin Richter & Hampton LLP

(57) ABSTRACT

A shower door assembly is disclosed comprising a stationary frame, a movable frame with a through hole, an upper frame, a lower frame, and an adjusting assembly. The adjusting assembly further comprises a fixing block disposed between the stationary frame and the movable frame and received in the stationary frame, the fixing block having a passage with a first rectangular cross-section, and rotating blocks received in the upper frame and the lower frame respectively and having a rotating handle and an adjusting shaft perpendicular to the rotating handle. The end of the adjusting shaft remote from the rotating handle has a second rectangular cross-section with dimensions identical to the first rectangular cross-section, and an engaging element is disposed on at least one surface of the adjusting shaft.

7 Claims, 6 Drawing Sheets

SHOWER DOOR ASSEMBLY

CROSS-REFERENCE TO RELATED APPLICATION

The present invention claims priority benefit from Chinese utility model application No. 201320089404.3 filed on Feb. 27, 2013, the disclosure of which is hereby incorporated herein by reference.

FIELD OF THE INVENTION

The present invention relates to a shower door assembly and, in particular to a structure for installing and adjusting a stationary frame and movable frame of the shower door.

BACKGROUND OF THE INVENTION

Conventionally, shower doors are always installed by drilling on the stationary frame and movable frames and then using screws to fix them to a wall surface. However, the installation process is very inconvenient to operators and time-consuming. Moreover, the drilling may cause damages or scares to surfaces of the frames made of, for example, aluminum or its alloys, and in extreme cases, the drilling may cause the shower doors destroyed.

SUMMARY OF THE INVENTION

One object of the present invention is to provide a shower door assembly with simple structure, which is convenient and quick to install without drilling holes in the installation process.

To achieve the object, a shower door assembly is provided which comprises a stationary frame, a movable frame with a through hole, an upper frame, a lower frame, and an adjusting assembly. The adjusting assembly comprises a fixing block disposed between the stationary frame and the movable frame and received in the stationary frame, and rotating blocks received in the upper frame and the lower frame respectively and having a rotating handle and an adjusting shaft perpendicular to the rotating handle. The fixing block further has a passage with a first substantially rectangular cross-section. An end of the adjusting shaft remote from the rotating handle has a second substantially rectangular cross-section with a dimension identical to the first substantially rectangular cross-section. An engaging element is disposed on at least one surface of the adjusting shaft.

In one embodiment, the adjusting assembly includes a circlip and the adjusting shaft has an annular groove at the end thereof adjacent to the rotating handle, in which annular groove the circlip is disposed.

In one embodiment, the fixing block has a guiding portion connected with the passage. In another embodiment, the adjusting shaft has a second guiding portion at an end thereof remote from the rotating handle to facilitate insertion of the adjusting shaft into the passage.

In one embodiment according to the present invention, the fixing block has a screw hole and the stationary frame has a first through hole. The fixing block is connected to the stationary frame by a fastener through the screw hole and the through hole.

In one embodiment according to the present invention, the adjusting shaft has a shaft portion and a head portion having a cross-section area greater than that of the shaft portion. In one embodiment, the engaging element is disposed at the head portion.

In one embodiment according to the present invention, short edges of the second substantially rectangular cross-section are parallel to a length direction of the rotating handle. Preferably, the engaging element is disposed in such planes that the short edges reside in and that are perpendicular to the length direction of the rotating handle. More preferably, the engaging element is disposed in one of such planes.

In one embodiment according to the present invention, the engaging element has multiple strip-shaped projections parallel to one another, or multiple cone-shaped projections in a distributed pattern.

The shower door assembly according to the present invention has simple structures and is convenient and quick to install without drilling holes in the installation process. Meanwhile, the present invention can assure a satisfying appearance and quality of the products because there is no need to drill holes on the surface of the frames made of, for example, aluminum.

BRIEF DESCRIPTION OF THE DRAWINGS

Further advantages and details of the present invention emerge from the example embodiments described below, which do not limit the invention in any way, and from the drawings, in which.

Elements that are irrelevant to the spirit of the present invention are omitted for clarity.

DETAILED DESCRIPTION OF THE INVENTION

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" include any and all combinations of one or more of the associated listed items. It will be further understood that the terms "comprises" "comprising" "includes" and/or "including" when used herein, specify the presence of stated features, integers, steps, operations, elements, and/or components, but do not preclude the presence or addition of one or more other features, integers, steps, operations, elements, components, and/or groups thereof.

Figure 1:
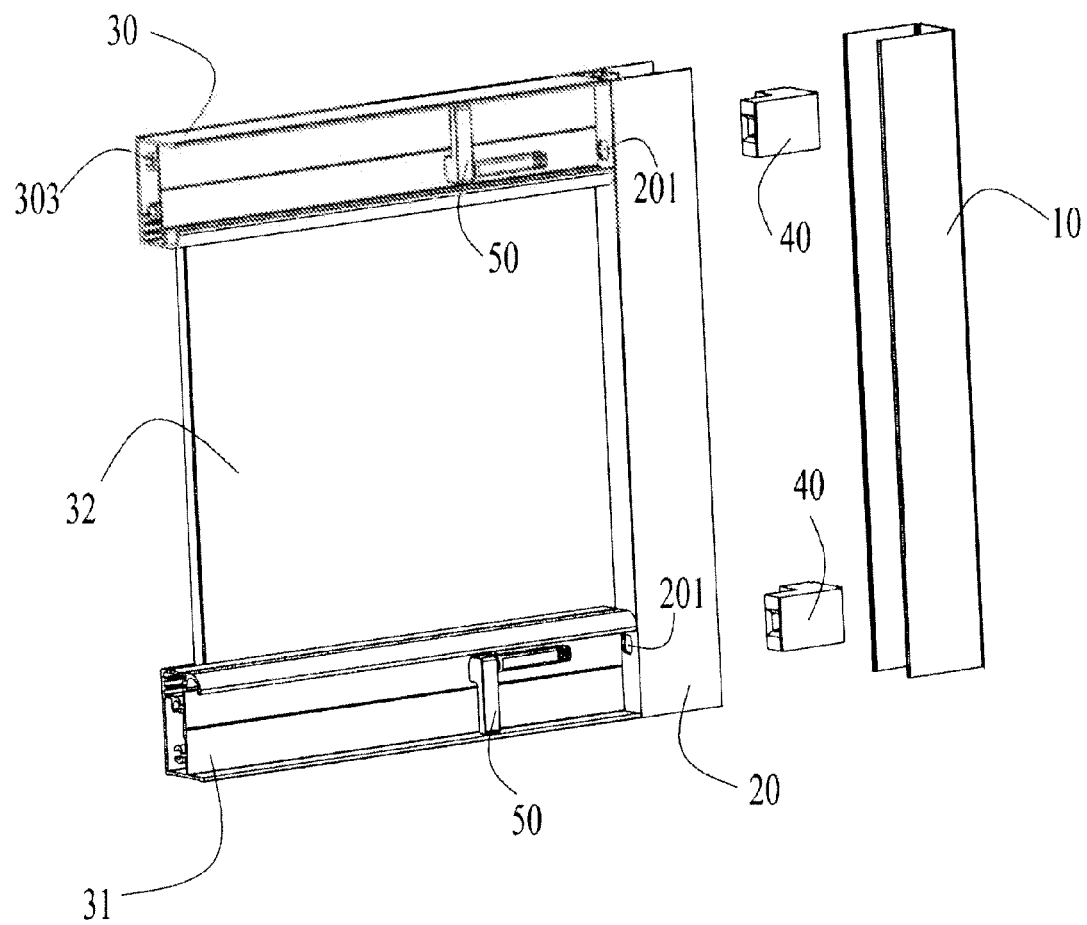
FIG. 1 illustrates the primary components of an exemplary shower door assembly according to one embodiment of the present invention.

FIG. 1 illustrates the primary components of an exemplary shower door assembly according to one embodiment of the present invention. The shower door assembly includes a stationary frame 10, a movable frame 20, an upper frame 30, a lower frame 31 and a glass door 32 disposed between the upper and lower frames 30, 31. The shower door assembly further comprises an adjusting assembly consisting substantially of a fixing block 40 and a rotating block 50.

The upper frame 30 and the lower frame 31 are disposed respectively at the opposite ends of the movable frame 20 and are both perpendicular to the movable frame 20. The upper and lower frames 30, 31 are connected detachably to the movable frame 20 in a suitable manner. In the embodiment shown, the upper and lower frames 30, 31 have a screw hole 303 respectively, and the movable frame 20 has a through hole 203 (FIG. 8) corresponding to the screw hole 303. The upper and lower frames can be connected detachably to the movable frame 20 by fastener. The movable frame 20 has a through hole 201 and the rotating block 50 can go across the through hole 201 to engage with the fixing block 40 which will be described in detail below.

Figure 2:
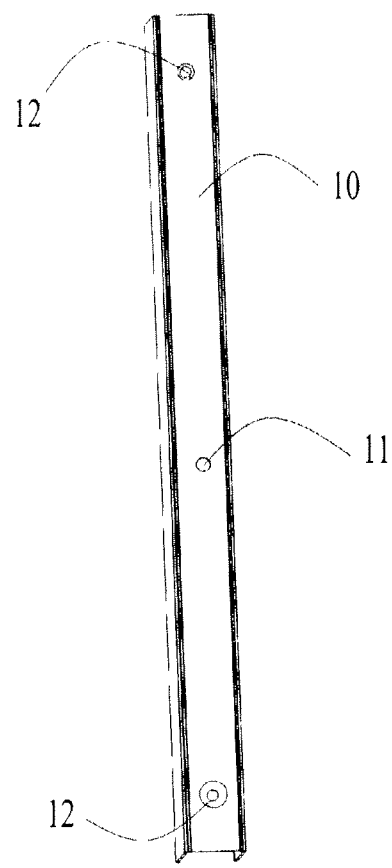
FIG. 2 is a perspective view of the stationary frame of an exemplary shower door assembly according to one embodiment of the present invention.

The stationary frame 10 can be installed to a surface of wall in many manners. Referring to FIG. 2 which is a perspective view of the stationary frame of an exemplary shower door assembly according to one embodiment of the present invention, the stationary frame 10 has a screw hole 11 such that the stationary frame 10 is installed to the wall by fastener through the screw hole 11. It is possible for a skilled person to install the stationary frame to the wall in other suitable manner, such as using adhesive agents.

Figure 3:
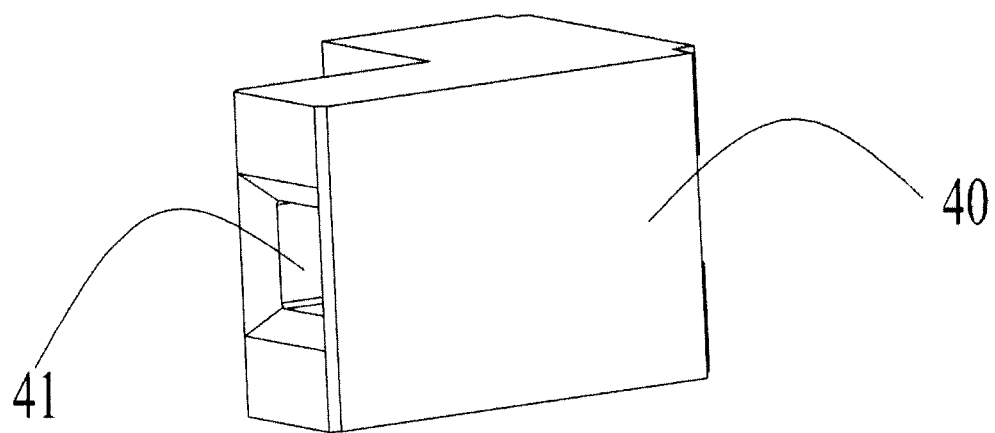
FIGS. 3 and 4 are different perspective views of a fixing block of an exemplary shower door assembly according to one embodiment of the present invention.
Figure 4:
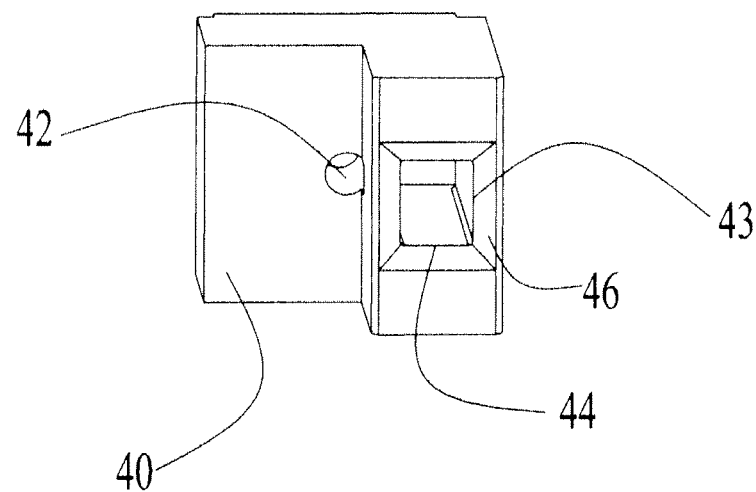
Figure 5:
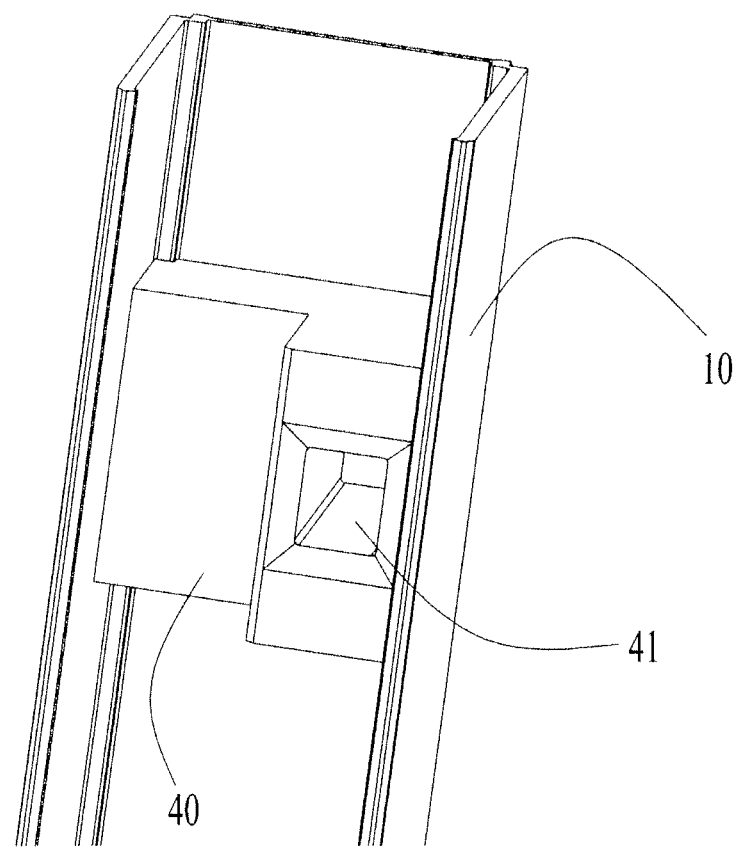
FIG. 5 is a partial view showing the fixing block has been installed to the stationary frame.

The fixing block 40 is at least partially received in and fixed to the stationary frame 10. Referring to FIGS. 3 and 4 illustrating different perspective views of the fixing block 40, the fixing block 40 includes a passage 41 and a through hole 42. Correspondingly, referring to FIG. 2, the stationary frame 10 has a screw hole 12. The fixing block 40 is connected to the stationary frame 10 by a fastener through the through hole 42 and screw hole 12. The dimensions of the fixing block 40 should be smaller than the dimensions of the inner space of the stationary frame 10 such that the fixing block is received in the stationary frame.

The passage 41 of the fixing block 40 has a rectangular cross-section having a long edge 43 and a short edge 44 smaller than the long edge 43. In another embodiment, the long edge 43 and the short edge 44 can be replaced each other. For more easily implementing the present invention, preferably, the long edge 43 is slightly longer than the short edge 44, for example the long edge 43 is approximately 0.1 cm to 2 cm longer than the short edge 44, preferably, approximately 0.5 cm to 1 cm and 0.8 cm to 1.2 cm, and more preferably, approximately 1 cm. It is possible for a skilled person to adjust the difference between the long edge and the short edge depending on actual conditions so as to achieve the locked state as described below.

In this embodiment, the passage 41 is formed of plastic materials, in particular such as synthetic resin or natural resin. The entire fixing block 40 is preferably formed of plastic materials.

In this embodiment, as shown in FIG. 4, the fixing block 40 has a wedge-shaped guiding portion 46 connected with the passage 41. The guiding portion 46 facilitates insertion of the rotating block 50 into the passage 41, which will be described in detail below.

Figure 6:
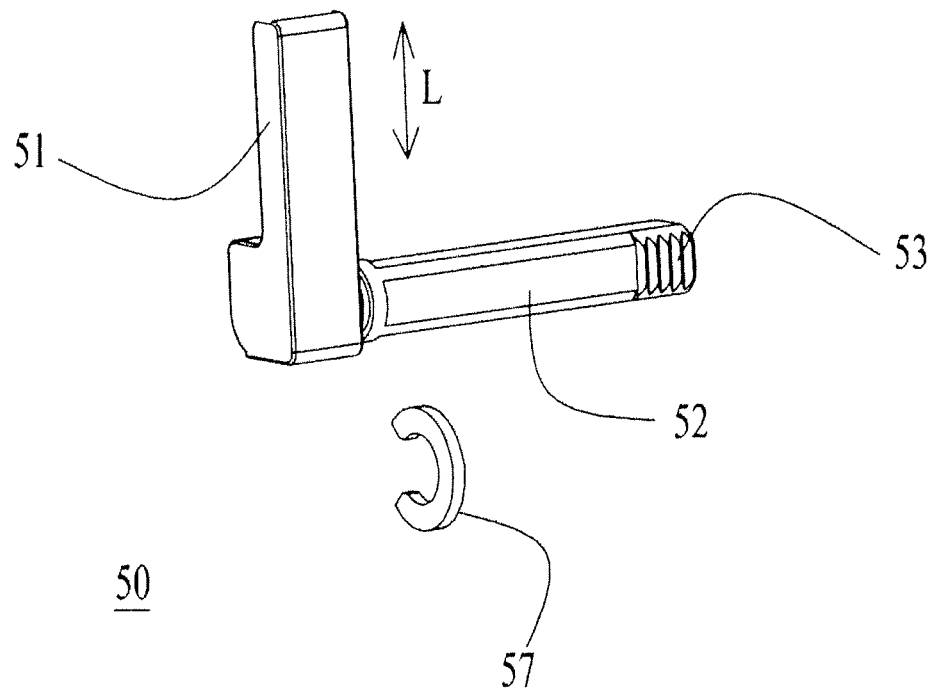
FIGS. 6 and 7 are different perspective views of a rotating block of an exemplary shower door assembly according to one embodiment of the present invention.
Figure 7:
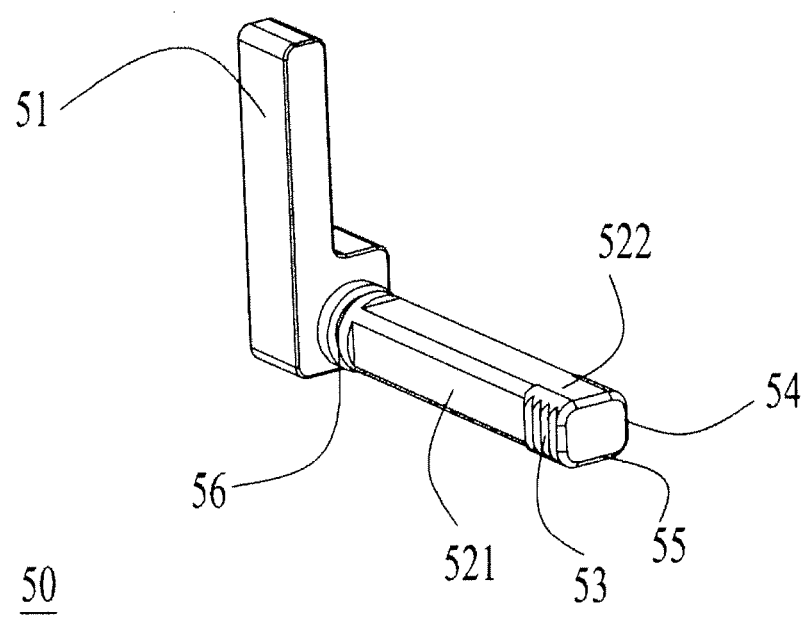

FIGS. 6 and 7 are different perspective views of a rotating block of an exemplary shower door assembly according to one embodiment of the present invention. In this embodiment, the rotating block 50 includes a rotating handle 51 and an adjusting shaft 52 perpendicular to the rotating handle in the length direction "L" indicated by a double arrow in FIG. 6. The length of the adjusting shaft is determined as required, which is for example generally 5 cm to 20 cm, and preferably 10 cm to 15 cm, such as 15 cm. The passage 41 thus has a length corresponding to the length of the adjusting shaft 52 so that the adjusting shaft 52 can be inserted into the passage 41.

The end of the adjusting shaft 52 remote from the rotating handle 51 has a rectangular cross-section with a long edge 55 substantially equal to the long edge 43 and preferably exactly equal to the long edge 43, and a short edge 54 substantially equal to the short edge 44 and preferably exactly equal to the short edge 44 so that the adjusting shaft can be inserted into and exited from the passage 41.

In one embodiment, the dimensions of the cross-section of the adjusting shaft 52 are identical in length direction of the adjusting shaft 52. In another embodiment, as shown in FIG. 7, the adjusting shaft 52 has a shaft portion 521 and a head portion 522 with a cross-section area smaller slightly than the head portion. The dimensions of the cross-section of the head portion 522 are identical to the dimensions of the cross-section of the passage 41.

The rotating block 50 can be connected to the movable frame 20 in a suitable manner. In the embodiment shown in the FIG. 7, the adjusting shaft has an annular groove 56 at the end of the adjusting shaft adjacent to the rotating handle 51. When the adjusting shaft 52 completely go through the through hole 201, a circlip 57 is disposed in the annular groove 56 so as to prevent the adjusting shaft 52 from moving in the direction far away from the stationary frame 10. It is possible for a skilled person to connect the rotating block 50 detachably to the movable frame 20 in other suitable manners.

As shown in FIGS. 6 and 7, an engaging element 53 is disposed on the surface of the adjusting shaft 52. In this embodiment, the engaging element 53 is teeth, and in particular is strip-shaped projections parallel to each other. In another embodiment, the engaging element 53 is multiple cone-shaped projections in a distributed pattern. As shown in the Figures, the engaging element 53 is only disposed on the head portion 522. In a further embodiment, engaging element 53 is disposed on the entire surface of the adjusting shaft 52 in the length direction thereof.

Referring to FIG. 7, the engaging element 53 is disposed on planes that are perpendicular to the length direction of the rotating handle and within which the short edge 54 resides. In a preferred embodiment, the engaging element 53 is only disposed on one of such planes. In this embodiment, the short edge 54 is parallel to the length direction of the rotating handle.

Figure 8:
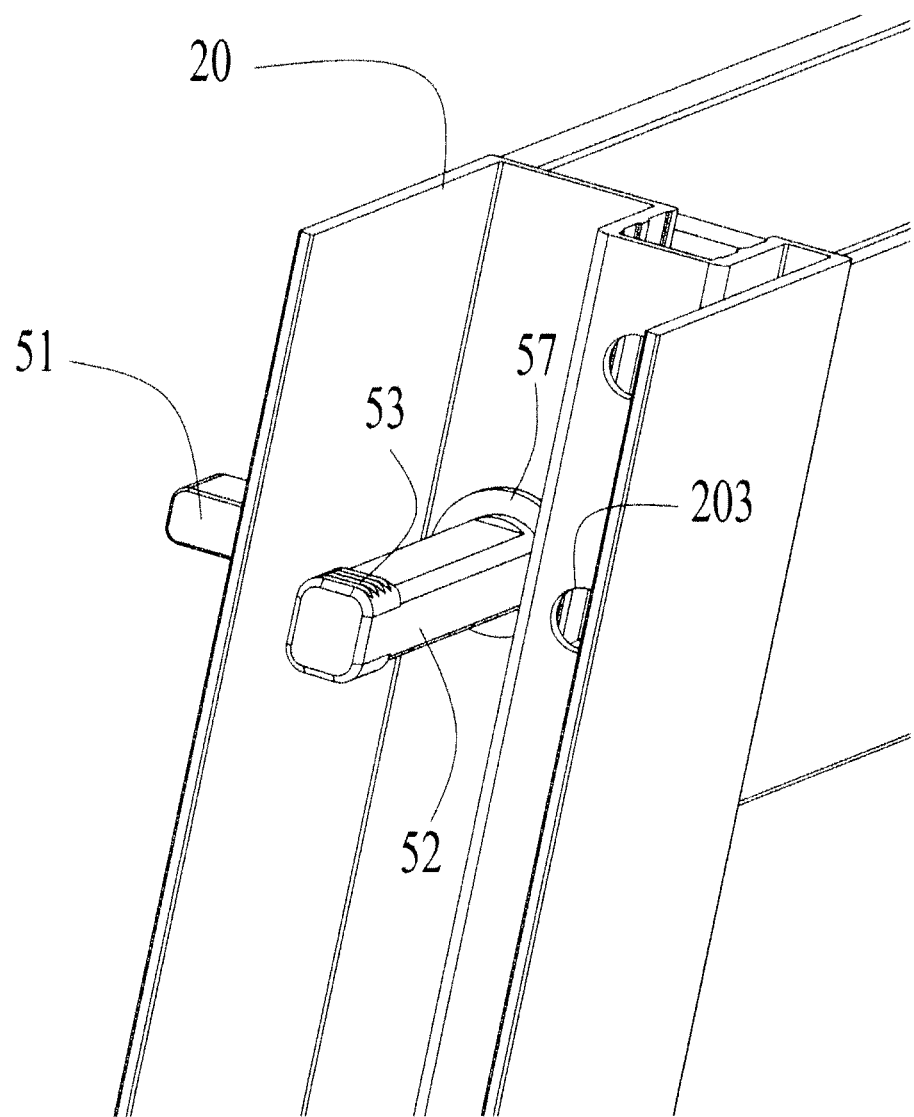
FIG. 8 is a partial view showing the rotating block has been installed to the movable frame.

FIG. 8 shows that the rotating block 50 is installed to the movable frame 20. In this Figure, the length direction of the rotating handle 51 is perpendicular to the length direction of the movable frame 20, and the shower door assembly is in "open state".

Figure 9:
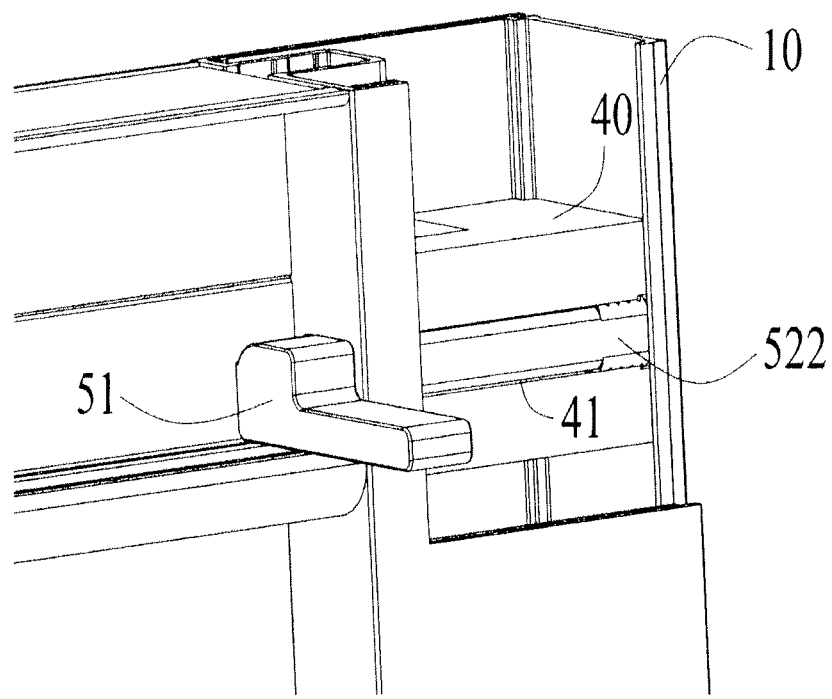
FIG. 9 is a partially sectional view of the shower door assembly as being opened after installation.
Figure 10:
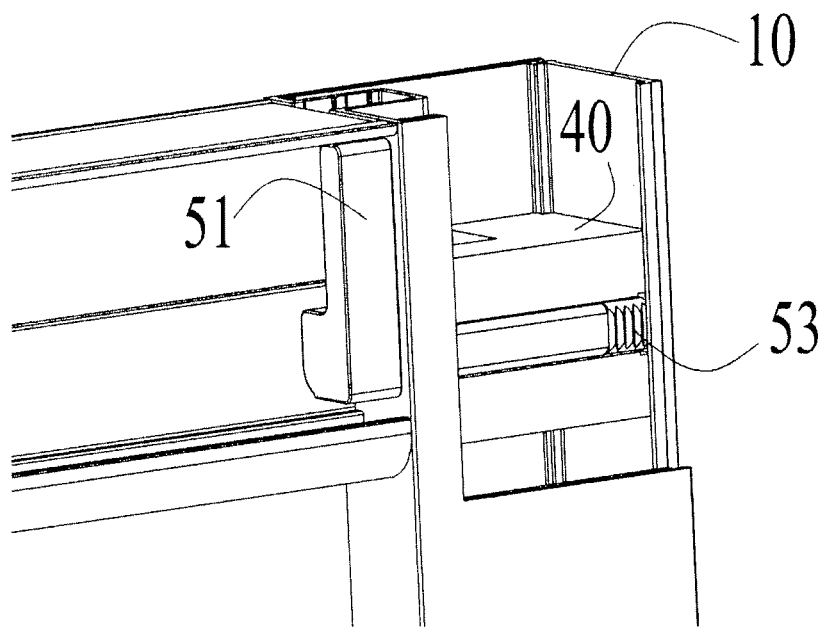
FIG. 10 is a partially sectional view of the shower door assembly as being closed after installation.

FIGS. 9 and 10 are partially sectional views of the shower door assembly in open and close state, respectively, after all components are installed together. The rotating block 50 can be freely inserted into the passage 41 in the state shown in FIG. 9 due to identical dimensions between the adjusting shaft 52 and the passage 41. When the relative position of the movable frame 20 and the stationary frame 10 is determined, the long edge 55 of the adjusting shaft 52 can act on the short edge 44 of the passage 41 and the short edge 54 is faced to the long edge 43 of the passage 41 by rotating the rotating handle 51 upward by a degree of 90° so that the engaging element 53 is engaged with the corresponding inner wall of the passage 41. The end or the head portion of the adjusting shaft 52 can be coupled with the passage 41 closely, i.e., in "close state", due to the plastic deformation and elasticity of the fixing block 40. The shower door assembly can also be switched to the "open state" by rotating the rotating handle 51 downward by a degree of 90°.

The positions of the long edge and the short edge can be adjusted to assure that the shower door assembly is switched to the "open state" by rotating the rotating handle 51 upward by a degree of 90° or to the "close state" by rotating the rotating handle 51 downward by the same degree. It is preferable for the rotating handle 51 to be received in the upper and lower frames 30, 31 without any portion projecting outward.

In a further embodiment of the present invention, the adjusting shaft 52 has a rectangular cross-section with rounded corners, avoiding the sharp edges formed on the adjusting shaft.

In a further embodiment of the present invention, similarly, the head portion of the adjusting shaft 52 has a guiding portion which is for example wedge-shaped to facilitate the insertion of the adjusting shaft 52 into the passage 41.

During installation process, firstly the fixing block 40 is installed to the stationary frame 10 which has been fixed to the wall. Secondly, the movable frame 20 and the upper and lower frames 30, 31 are installed together, and the rotating block 50 is installed to the upper and lower frames and subsequently fixed to the movable frame 20. When the movable frame 20 is moved toward the stationary frame 10, the adjusting shaft 52 of the rotating block 50 is inserted into the passage 41 of the fixing block 40. The rotating handle 51 is rotated by a degree of 90° after the relative position of the movable frame 20 and the stationary frame 10 is determined as required such that the adjusting shaft 52 is coupled with the passage 41 closely without relative motion between the movable frame 20 and the stationary frame 10. The handle 51 is rotated by a degree of 90° in an opposite direction as required to change the relative position thereof to allow the adjusting shaft 52 to be moved off the passage 41, and thus the movable frame 20 can be moved relative to the stationary frame 10 again.

It should be understood that various example embodiments have been described with reference to the accompanying drawings in which only some example embodiments are shown. The present invention, however, may be embodied in many alternate forms and should not be construed as limited to only the example embodiments set forth herein.

What is claimed is:

1. A shower door assembly, comprising:
   a stationary frame,
   a movable frame having a through hole,
   an upper frame,
   a lower frame, and
   an adjusting assembly comprising
      fixing blocks disposed between the stationary frame and the movable frame and received in the stationary frame, the fixing blocks having a passage with a first rectangular cross-section, and
      rotating blocks received in the upper frame and the lower frame respectively and having a rotating handle and an adjusting shaft perpendicular to the rotating handle;
   wherein an end of the adjusting shaft remote from the rotating handle has a second rectangular cross-section with dimensions identical to the first rectangular cross-section, and an engaging element is disposed on at least one surface of the adjusting shaft.

2. The shower door assembly of claim 1, wherein the adjusting assembly includes a circlip and the adjusting shaft has an annular groove at an end thereof adjacent to the rotating handle, in which annular groove the circlip is disposed.

3. The shower door assembly of claim 1, wherein the fixing block has a guiding portion connected with the passage.

4. The shower door assembly of claim 1, wherein the adjusting shaft has a guiding portion at an end thereof remote from the rotating handle.

5. The shower door assembly of claim 1, wherein the adjusting shaft has a shaft portion, and a head portion having a cross-section area greater than the shaft portion.

6. The shower door assembly of claim 5, wherein the engaging element is disposed at the head portion.

7. The shower door assembly of claim 1, wherein the engaging element has multiple strip-shaped projections parallel to one another, or multiple cone-shaped projections.

* * * * *